Jan. 27, 1953 M. W. NIXON 2,626,611
ROTOR FOR CORN SHELLERS
Filed Sept. 25, 1946 2 SHEETS—SHEET 2
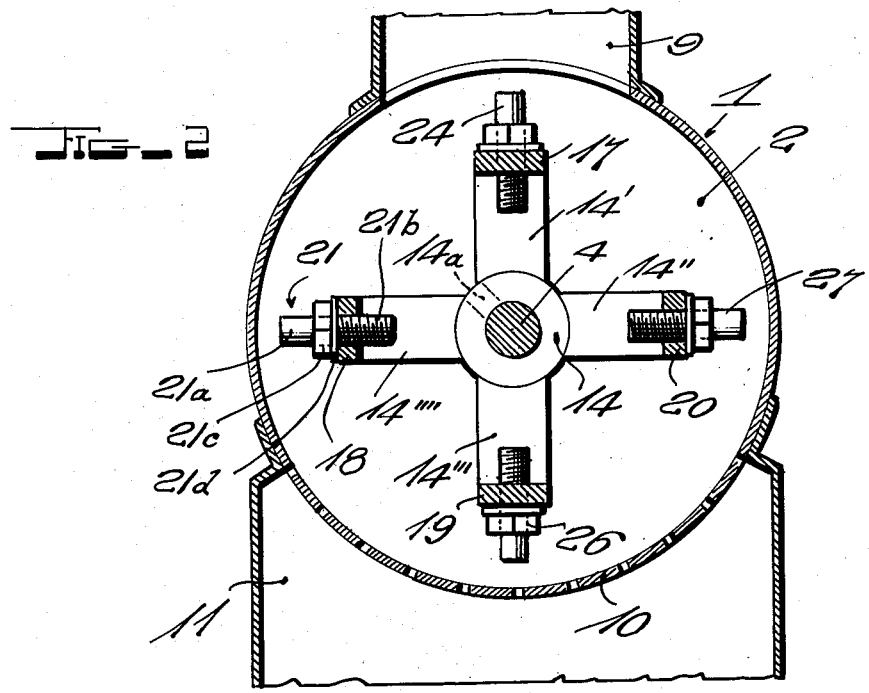
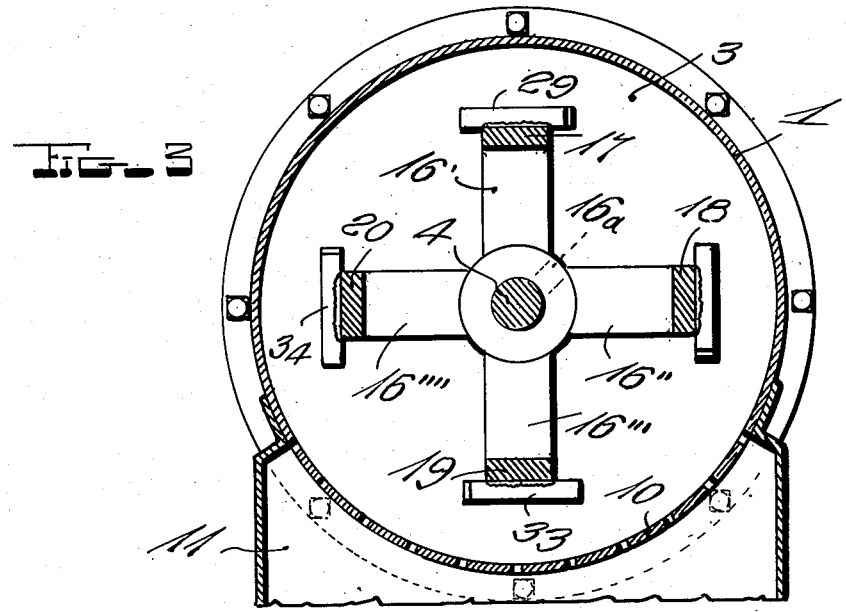
INVENTOR.
Maurice W. Nixon,
BY
John B. Brady
ATTORNEY Patented Jan. 27, 1953

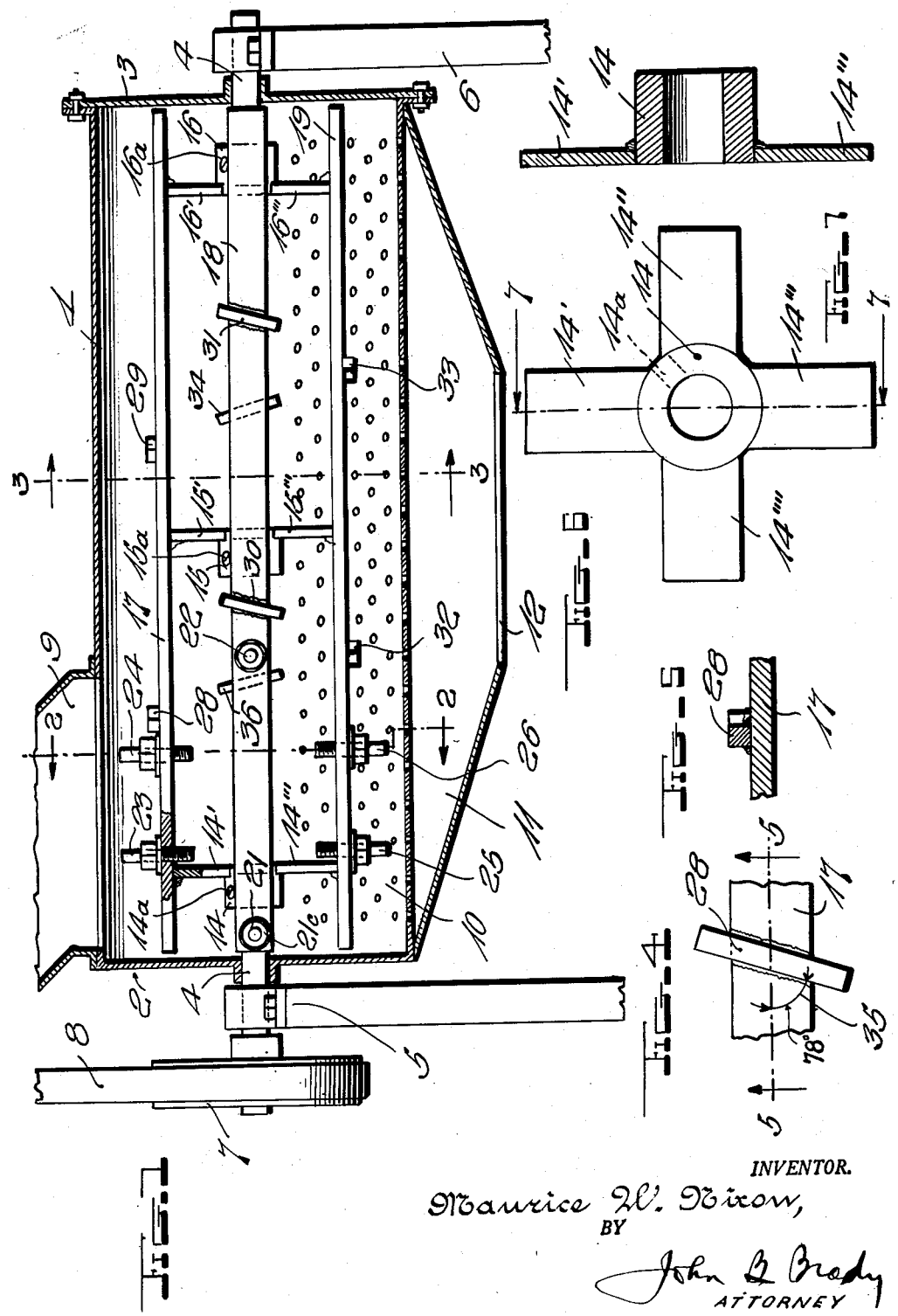

2,626,611

UNITED STATES PATENT OFFICE 2,626,611

ROTOR FOR CORN SHELLERS

Maurice W. Nixon, Belleville, Pa., assignor, by mesne assignments, to The Sperry Corporation, New York, N. Y., a corporation of Delaware Application September 25, 1946, Serial No. 699,317

7 Claims. (Cl. 130—6)

My invention relates broadly to corn shellers and more particularly, to an improved construction of rotor for corn shelling apparatus.

My invention relates to that class of corn shellers shown in Letters Patent 2,271,897 and 2,271,898, granted February 3, 1942, to Aquila D. Mast, and constitutes an improvement in the construction of rotor used therein.

One of the objects of my invention is to provide an improved construction of corn shelling rotor which is dynamically balanced and which is provided with corn engaging spikes and kernel stripping cleats assembled in a simplified manner and capable of inexpensive production and reliable operation.

Another object of my invention is to provide a construction of corn shelling rotor comprising sets of spokes carried by a rotatable shaft for supporting longitudinally extending bars in dynamically balanced relation thereto and wherein the bars form mounting means for radially disposed spikes and angularly disposed kernel stripping cleats for engaging snapped or husked ears of corn.

Still another object of my invention is to provide a construction of dynamically balanced rotor for corn shellers consisting of a plurality of spaced hubs carried by a rotatable shaft with spokes extending from said hubs for supporting on its extremities longitudinally extending substantially parallel bars wherein the bars each support spaced spikes and cleat members distributed in predetermined relation with respect to the casing of the corn shelling apparatus for effectively separating the corn from the cobs.

Other and further objects of my invention reside in the novel construction of rotator for corn shellers as set forth more fully in the specifications hereinafter following by reference to the accompanying drawings, in which:

Figure 1 is a vertical sectional view through a corn sheller showing the rotator of my invention, in elevation, journaled therein and with a portion thereof broken away and illustrated in section; Fig. 2 is a vertical sectional view taken substantially on line 2—2 of Fig. 1; Fig. 3 is a vertical sectional view taken substantially on line 3—3 of Fig. 1; Fig. 4 is a fragmentary plan view showing the manner of mounting one of the cleats on one of the longitudinally extending bars of the rotator; Fig. 5 is a transverse sectional view taken on line 5—5 of Fig. 4; Fig. 6 is an end view of one of the mounting hubs and associated spokes employed in the construction of the rotor; and Fig. 7 is a vertical sectional view taken through one of the hubs and associated spokes substantially on line 7—7 of Fig. 6.

Referring to the drawings in detail reference character 1 designates the housing or casing of a corn sheller having end closures 2 and 3 through which rotatable shaft 4 extends longitudinally through the housing 1. The rotatable shaft 4 is journaled at opposite ends in vertically extending supporting means represented at 5 and 6. The shaft 4 is driven through a suitable pulley 7 and driving belt 8. A hopper 9 is provided for delivering the corn to the housing 1 for operation thereon by the rotator system.

The housing 1 is provided with a perforated base 10 for screening the kernels of corn from the cobs during the shelling operation. The kernels are delivered through the perforated base 10 to the discharge chute 11 for delivery to a bin through central aperture 12.

The rotator system is a dynamically balanced structure and comprises a multiplicity of hub members 14, 15 and 16 which are secured at spaced intervals along rotary shaft 4 by suitable securing means such as set screws 14a, 15a and 16a. The hubs 14, 15 and 16 each carry radially disposed spokes thereon. The spokes associated with hub 14 are indicated at 14', 14'', 14''' and 14''''. The spokes are in the form of flat steel strips which are welded to the hubs. In the case of hub 15 a similar set of spokes is provided as represented, for example, in Fig. 1 at 15' and 15'''. In the case of hub 16 a similar set of spokes is provided as represented more particularly in Figs. 1 and 3 at 16', 16'', 16''' and 16''''.

The welded radially extending spokes on the several hubs are longitudinally aligned and serve as carriers for the longitudinally extending bars shown at 17, 18, 19 and 20. The bars 17, 18, 19 and 20 are of flat rectangular section and are welded to the extremities of the radially extending spokes; that is to say, the longitudinally extending bar 17 is welded to the extremities of spokes 14', 15' and 16'. Bar 18 is similarly positioned. Bar 19 is welded to the ends of spokes 14''', 15''' and 16'''. Bar 20 is similarly arranged. Each of the bars extends substantially the length of the interior of the housing or casing. The arrangement of longitudinally extending bars supported on the ends of the spokes provides a longitudinally extending unobstructed end to end spacing between said bars over angular distances spaced approximately 90° from one longitudinal bar to an adjacent longitudinal bar.

The longitudinally extending bars 17, 18, 19 and 20 form carriers for sets of spikes and sets of angularly arranged cleats. For example, the longitudinally extending bar 17 provides a support for spikes 23 and 24 substantially aligned with the opening from the delivery hopper 9. Bar 18 carries spikes 21 and 22 which are spacially displaced from alignment with spikes 23 and 24 but substantially within the delivery zone of the ears of corn delivered by the delivery opening 9 of the hopper. Bar 19 carries spikes 25 and 26 substantially aligned in a radial direction with the spikes 23 and 24 carried by bar 17. Similarly, bar 20 carries spikes, one of which may be seen at 27 in Fig. 2, and which are aligned with spikes 21 and 22 carried by bar 18.

Each of the spikes consist of a cylindrical smooth walled shank represented, for example, in Fig. 2 at 21a, and a screw-threaded shank 21b. The screw-threaded shank 21b has nut 21c screw-threaded thereon with a co-acting washer member 21d adjacent thereto. The screw-threaded shank 21b is adapted to engage corresponding screw threads in bar 18 and the spike screwed to a solid position with washer 21d and nut 21c in abutment against the surface of bar 18 for solidly mounting the spike in position with reference to the longitudinally extending bar. The spikes 22, 23, 24, 25, 26 and 27 are similarly mounted for abrading the ears of corn which are delivered through the delivery opening 9. The fact that the spikes on oppositely disposed longitudinally extending bars are arranged substantially in diametrical alignment assists in directing the ears of corn toward the cleats which are carried by the bars.

Bar 17 carries spaced cleats 28 and 29; bar 18 carries spaced cleats 30 and 31; bar 19 carries spaced cleats 32 and 33 and bar 20 carries similarly arranged cleats, one of which is represented at 34 in Fig. 3. The cleats are shown more particularly in Figs. 4 and 5 as comprising steel bars of rectangular section which are angularly disposed with respect to the longitudinally extending bars, and which project on opposite sides of the longitudinally extending bars 17, 18, 19 and 20.

The cleats as represented at 28 in Figs. 4 and 5 are welded or otherwise secured to the longitudinally extending bars. I have found that for the most effective operation the cleats are secured in positions approximately 78° to the longitudinal axis of the bars as represented in Fig. 4 by the angle 35.

The cleats carried by each of the bars are disposed in substantially parallel angular planes; that is to say, the cleats 28 and 29 carried by bar 17 are arranged in spaced parallel planes. The cleats 30 and 31 carried by bar 18 are offset along bar 18 with respect to the centers of cleats 28 and 29 on bar 17, and are located in planes which are substantially parallel to each other but which extend in an angular direction opposite the angular direction of the planes in which cleats 28 and 29 extend. Similarly, cleats 32 and 33 on bar 19 extend in planes which are parallel to each other but which are angularly inclined in a direction opposite to the angular direction of cleats 30 and 31. Correspondingly, cleats 34 and 36 carried by bar 20 are disposed in planes parallel to each other but are inclined in a direction opposite to the direction of cleats 30 and 31.

The snapped or husked ears of corn are delivered through opening 9 of the housing 1 and the rotor therein. The driven rotor and the bars, spikes and cleats strike the ears of corn, severing the kernels from the cobs and advancing the corn along the interior of the casing until the kernels are substantially all removed therefrom.

The cleats 28, 29, 30, 31, 32, 33, 34 and 36 are all arranged in offset positions one with respect to the other. Each cleat extends at an acute angle with respect to the supporting bar and the several cleats co-act in pairs defining generally the elements of spirals. For example, cleats 30—32 and 31—33 constitute elements of spirals inclined toward the left while cleats 28—36 and 29—34 constitute elements of spirals inclined in the opposite angular direction. A differing spacial relation exists between the immediately adjacent spikes and cleats on each of the bars 17, 18, 19 and 20. That is to say, the spacial distance between spike 24 and cleat 28 differs from the spacial distance between spike 22 and cleat 30, while the distance between cleat 32 and spike 26 is different from the aforesaid distances and from the distance between the spike (not shown) that is adjacent spike 27 and the associated cleat 36.

The abrasive action to which the corn is subjected by this arrangement insures the stripping of the kernels from the cobs in a quick and efficient manner.

While I have described my invention in its preferred embodiment in which form it has been found highly efficient in operation I realize that modifications may be made and I desire that it be understood that no limitations upon my invention are intended other than may be imposed by the scope of the appended claims.

What I claim as new and desire to secure by Letters Patent of the United States is as follows:

1. A rotor for corn shellers comprising a rotatably driven shaft, a multiplicity of hub members mounted thereon, spokes carried by said hub members in longitudinal radial alignment with respect to said shaft, longitudinally extending flat rectangular bars secured to the ends of said spokes with the major axes of said bars disposed in planes extending normal to the radial axes of said spokes, the assembly of said bars with respect to said spokes providing longitudinally extending unobstructed end-to-end paths between said bars, and a multiplicity of spikes and cleats carried by each of said flat rectangular bars, said spikes projecting from the flat external surfaces thereof and said cleats projecting beyond each linear peripheral edge of said rectangular bars and constituting a dynamically balanced structure.

2. A rotor for corn shellers comprising a rotatably driven shaft, a multiplicity of hub members mounted thereon, spokes carried by said hub members in longitudinal radial alignment with respect to said shaft, longitudinally extending flat rectangular bars secured to the ends of said spokes with the major axes of said bars disposed in planes extending normal to the radial axes of said spokes, the assembly of said bars with respect to said spokes providing longitudinally extending unobstructed end-to-end substantially quadrantal paths between said longitudinally extending bars, and a multiplicity of radially disposed spikes and angularly arranged cleats carried by each of said rectangular bars said spikes projecting from the flat external surfaces thereof and said cleats projecting beyond each linear peripheral edge of said rectangular bars and forming a dynamically balanced structure.

3. A rotor for corn shellers comprising a rotatably driven shaft, a multiplicity of hub members mounted thereon, spokes carried by said hub members in longitudinal radial alignment with respect to said shaft, longitudinally extending flat rectangular bars secured to the ends of said spokes with the major axes of said bars disposed in planes extending normal to the radial axes of said spokes, the assembly of said bars with respect to said spokes providing longitudinally extending unobstructed end-to-end paths between said bars, and a multiplicity of radially disposed spikes and angularly inclined cleats carried by each of said flat rectangular bars, said cleats each being substantially rectangular in section and extending in planes substantially at acute angles to the longitudinal axes of said flat rectangular bars and projecting outwardly from the external surfaces of said flat rectangular bars and beyond the opposite linear edges thereof forming rectangular impact faces overhanging the opposite peripheral edges of said flat rectangular bars and constituting a dynamically balanced structure.

4. A rotor for corn shellers comprising a rotatably driven shaft, a multiplicity of hub members mounted thereon, spokes carried by said hub members in longitudinal radial alignment with respect to said shaft, longitudinally extending flat rectangular bars secured to the ends of said spokes with the major axes of said bars disposed in planes extending normal to the radial axes of said spokes, the assembly of said bars with respect to said spokes providing longitudinally extending unobstructed end-to-end paths between said bars, and a multiplicity of screw-threaded spike members engaged in spaced positions in each of said flat rectangular bars adjacent one of the ends thereof and, a multiplicity of cleats disposed in spaced positions on each of said flat rectangular bars, said cleats extending at substantially 78° with respect to the longitudinal axes of said flat rectangular bars and being located along said flat rectangular bars opposite to the ends thereof that carry said screw-threaded spike members and projecting beyond the opposite linear edges of said flat rectangular bars and forming rectangular impact faces and constituting a dynamically balanced structure.

5. A rotor for corn shellers comprising a rotatably driven shaft, a multiplicity of hub members mounted thereon, spokes carried by said hub members in longitudinal radial alignment with respect to said shaft, longitudinally flat rectangular extending bars secured to the ends of said spokes with the major axes of said bars disposed in planes extending normal to the radial axes of said spokes, the assembly of said bars with respect to said spokes providing longitudinally extending unobstructed end-to-end paths between said bars, and a multiplicity of screw-threaded spike members engaged in spaced positions in each of said flat rectangular bars adjacent one of the ends thereof and a multiplicity of cleats disposed in spaced positions on each of said flat rectangular bars, said cleats extending at substantially acute angles to the longitudinal axes of said flat rectangular bars and coacting cleats forming elements of spirals encircling said flat rectangular bars and projecting beyond opposite peripheral edges of said bars and forming rectangular impact end faces and constituting a dynamically balanced system.

6. A rotor for corn shellers comprising a rotatably driven shaft, a multiplicity of hub members mounted thereon, spokes carried by said hub members in longitudinal radial alignment with respect to said shaft, longitudinally extending flat rectangular bars secured to the ends of said spokes with the major axes of said bars disposed in planes extending normal to the radial axes of said spokes, the assembly of said bars with respect to said spokes forming a dynamically balanced structure providing longitudinally extending unobstructed end-to-end substantially quadrantal paths between said longitudinally extending bars, and a multiplicity of spikes and cleats carried by said flat rectangular bars, said cleats extending in spaced parallel planes offset from each other on adjacent flat rectangular bars with the cleats on opposite flat rectangular bars extending in planes oppositely directed with respect to each other, said cleats projecting beyond opposite peripheral edges of said bars and forming impact ends offset from the planes of the side edges of said bars.

7. A rotor for corn shellers comprising a rotatably driven shaft, a multiplicity of hub members mounted thereon, spokes carried by said hub members in longitudinal radial alignment with respect to said shaft, longitudinally extending flat rectangular bars secured to the ends of said spokes with the major axes of said bars disposed in planes extending normal to the axes of said spokes, the assembly of said bars with respect to said spokes comprising a dynamically balanced structure providing longitudinally extending unobstructed end-to-end paths between said longitudinally extending bars, a multiplicity of spike members positioned in spaced positions on each of said flat rectangular bars adjacent one of the ends thereof and a multiplicity of sets of cleats disposed in spaced positions on each of said flat rectangular bars and projecting beyond opposite peripheral edges of said bars and forming impact end faces disposed at angles to the planes of the peripheral edges of the bars and overhanging the said peripheral edges of said bars, said sets of cleats extending at substantially acute angles to the longitudinal axes of said flat rectangular bars, one set of said cleats constituting elements of a spiral inclined in one angular direction and another set of said cleats constituting elements of a spiral inclined in an opposite angular direction and coacting with said spike members for effecting the stripping of the kernels from cobs of corn passing through the rotor.

MAURICE W. NIXON.

REFERENCES CITED

The following references are of record in the file of this patent:

UNITED STATES PATENTS

| Number | Name | Date |
| --- | --- | --- |
| 247,232 | Whitman | Sept. 20, 1881 |
| 313,152 | Allfree | Mar. 3, 1885 |
| 514,317 | Gray | Feb. 6, 1894 |
| 642,792 | Hay | Feb. 6, 1900 |
| 999,072 | Watts | July 25, 1911 |
| 1,521,973 | Specketer | Jan. 6, 1925 |
| 1,651,037 | Mitchell | Nov. 29, 1927 |
| 1,951,070 | Stein | Mar. 13, 1934 |
| 2,271,898 | Mast | Feb. 3, 1942 |
| 2,347,664 | Chilton | May 2, 1944 |

FOREIGN PATENTS

| Number | Country | Date |
| --- | --- | --- |
| 306,449 | Great Britain | Apr. 24, 1930 |